Feb. 15, 1949.  F. D. HUNTSMAN  2,461,548
WINDOW STRUCTURE FOR PROTECTIVE DEVICES
Filed May 30, 1945
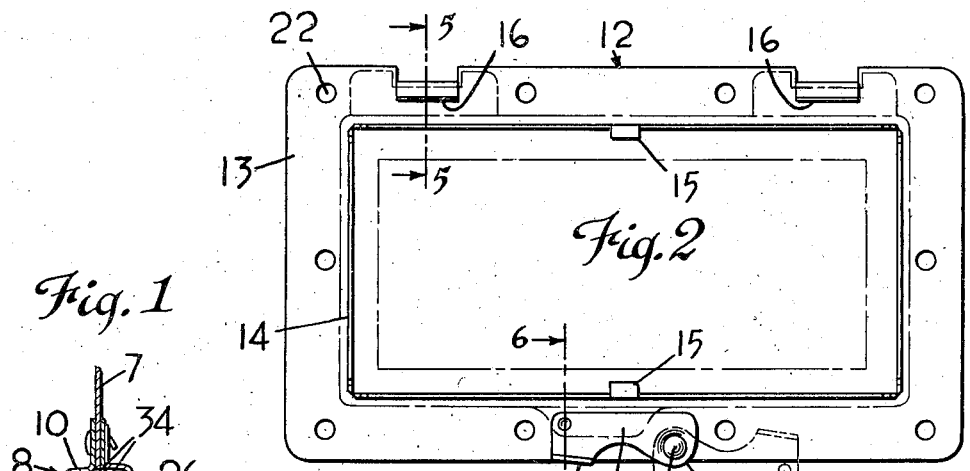
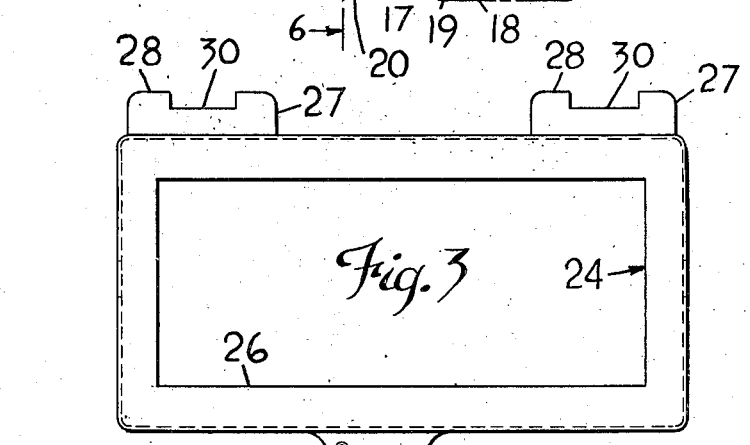
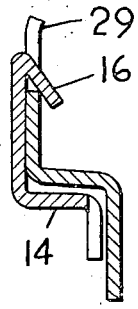
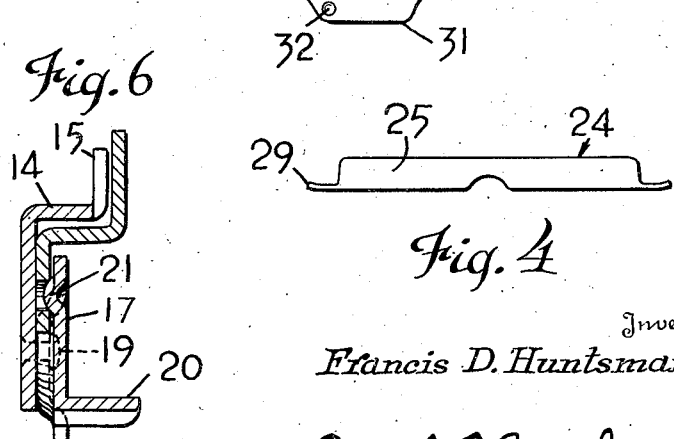
Inventor
Francis D. Huntsman
By Royal E. Burnham,
Attorney Patented Feb. 15, 1949

2,461,548

UNITED STATES PATENT OFFICE 2,461,548

WINDOW STRUCTURE FOR PROTECTIVE DEVICES

Francis D. Huntsman, Salt Lake City, Utah

Application May 30, 1945, Serial No. 596,611

5 Claims. (Cl. 2—8)

This invention relates to window structures in shields such as used by welders and others, for holding protective glass and other transparent sheet material to afford protection from intense and glaring light coming from a welding arc, impinging particles emanating from welding, and other matter injurious to workers' heads and eyes.

During some work of this kind, and particularly in welding, there is used a clear glass and behind it one or more colored or opalescent glasses to diminish the intensity of or to filter out injurious light rays. The clear glass, which is less expensive than colored and opalescent glass, is placed at the front to prevent pitting or other injury to the glass behind.

When the outer protective clear glass becomes blurred, it is necessary to replace it by another. Sometimes, also, it is desirable to change the colored or opalescent glasses from lighter to darker shade or vice versa to those of different light-screening properties, in accordance with variance in intensity or glare of the light encountered.

It is an object of the invention to provide a window structure, in shields of the kind referred to, so formed and arranged that the protective glasses therein may be inserted, removed, and replaced easily from the inside of the shield.

Another object is so to form the parts of the window that an inner cover frame thereof easily and quickly may be released for removal of glasses and insertion of others, and so that the cover frame may be quickly locked in place.

Further, it is an object so to form and assemble parts of the window that no light may enter the shield by reflection or refraction around the glasses.

Having in view the foregoing features that make for easy insertion and replacement of the glasses and their maintenance in place, the window structure of this invention consists merely of two parts, readily formed by stamping from sheet metal stock, which are permanently fixed to the wall of the shield; an inner cover frame, similarly formed from sheet metal stock, and a removable spring member to hold the glasses in the window.

When considered with the description herein, characteristics of the invention are apparent in the accompanying drawing, forming part hereof, in which an adaptation of the invention is disclosed in a shield of the welders' type for purpose of exemplification.

Like reference-characters refer to corresponding parts in the views of the drawing, of which—

Fig. 1 is a vertical sectional view of the window structure;

Fig. 2 is a view in elevation of the inner side of the window;

Fig. 3 is a view in elevation of the cover frame;

Fig. 4 is an end view of the cover frame;

Fig. 5 is a section on line 5—5, Fig. 2;

Fig. 6 is a section on line 6—6, Fig. 2.

The window structure is fixed to the front wall 7 of a shield body of sheet material, and it encompasses the sight opening thereof.

The window structure includes an outer frame member 8, which is fixed closely against the outer side of the wall 7 and surrounds the sight opening thereof.

The frame 8 comprises a marginal web or plate 9 as the part abutting against the shield wall; an outwardly extending wall 10 of dimensions and shape corresponding to those of the sight opening, and a marginal inturned flange 11 of the wall 10 disposed substantially parallel to the plane of the plate or web 9 and extending inwardly over the sight opening and encompassing a sight opening smaller than that of the shield. The frame 8 as thus formed and installed only slightly protrudes beyond the plane of the shield body; that is, only the rather narrow width of the wall 10.

An inner frame member 12 of the window comprises a web or plate 13, which corresponds in size and shape to the plate 9 and closely contacts the inner side of the shield wall 7 opposite to the latter plate. The material of the plate 13 is struck inwardly therefrom as a marginal wall 14 of a sight opening aligned with that of the outer frame. Oppositely positioned lugs 15 of the wall 14 extend into the sight opening for a purpose later explained. The plate 13 in one edge portion, preferably at the top, is cut back at spaced places and back or down turned as hook-like fingers 16 disposed over the plate 13. The fingers and plate afford V-shaped recesses.

A lock member 17, having a cam 18 at one end, is pivoted at that end at 19 on the part of the plate 13 opposite to the part having the fingers 16. The lock member has a finger piece 20 at its free end, and its material is struck down as a lock projection 21.

The oppositely disposed plates 9 and 13 of the outer and inner frames, respectively, have aligned holes, those of the inner frame being designated by 22. These holes are for accommodation of rivets 23 or other fasteners, which hold the two frames securely and permanently clamped against opposite sides of the shield wall 7.

The window structure also includes a cover frame member 24. It has a surrounding wall 25 of a shape corresponding to the wall 14 of the inner frame and of a size to enable it to fit closely outside of that wall. A marginal inturned flange 26 of the wall 25 is of a size and shape corresponding to that of the flange 11 of the outer frame 8, and it is aligned therewith when the member 24 is closed.

Material of the wall 25 extends therefrom as integral flanges 27 at spaced places corresponding to the positions of the fingers 16 of the inner frame 12. Each of these flanges has lugs 28 extending therefrom and spaced to straddle the fingers 16. The free ends of the lugs are slightly outturned from the plate 13, as shown at 29. The edge 30 between the lugs 28 of each flange 27 wedges into the V-shaped recesses under the fingers 16.

The wall 25, at a place in the perimeter of the cover frame opposite to the flanges 27, has a lock plate 31 to contact with the plate 13 of the inner frame in the arc of movement of the lock member 17, and it has a depression or seat 32 positioned to receive the lock projection 21 whereby the lock member is held locked.

The edge of the wall 25, the flanges 27, and the lock plate 31 are disposed in a plane corresponding to that of the plate 13, and they closely contact therewith when the cover frame is closed.

A clear lens 33 normally is positioned against the flange 11 of the outer frame, and colored or other light screening lenses 34 are positioned behind the clear lens. Gaskets 35 usually are interposed between the lenses. The sight opening encompassed by the wall 14 of the inner frame is of a size to permit the lenses to be placed in and removed from the window, when they are tilted to clear the overhanging lugs 15.

The lenses are kept in place in the window by a frame-like spring 36 interposed between the inner lens 34 and the lugs 15. The sides and ends of the spring are bowed, so that, when in holding position, it urges against the lenses and lugs and keeps the lenses in place. The spring may be placed and removed by flexing from under the lugs. In order to facilitate the flexing out of the spring, each of its end members is rounded outwardly, as shown at 37 (Fig. 1), so that a finger of a hand may be inserted under it to flex the spring out.

The cover frame is held closed by its flanges 27 wedged under the fingers 16 of the inner frame and by the lock member 17 which locks over the plate 31, where it is held locked by engagement of its projection 21 in the seat 32. This is the normal or working position of the parts.

With the outer frame 8 and the inner frame 12 clamped against opposite sides of the shield wall 7, the lenses held by the spring 36 closely against the gaskets between them, and the cover frame 24 with its wall 25 encompassing and closely fitting against the outside of the wall 14 of the inner frame and held there by the lock 17 and the fingers 16, light can enter the shield by way of the window only through the screening lenses and none can enter through the window around the lenses by reflection or refraction.

The cover frame not only contributes to exclusion of light other than directly through the lenses, but also to retention of the lenses in place. Although the spring 36 in normal use of the shield reliably retains the lenses in place, if it becomes dislodged from under the lugs 15, the flange 26, which extends over the spring, will retain the spring under tension against the lenses. Moreover, the flange 26, which encompasses a sight opening and thus overhangs it, will prevent the lenses from falling out if the springs becomes broken.

When it is desired to replace one or more of the lenses, the cover frame is released at one edge by swinging the lock member 17 from locked position. Then the cover frame is swung at that edge from the inner frame, the flanges 27 are withdrawn from under the fingers 16 of the inner frame, and the cover frame is removed. Then the spring 36, on being flexed, is withdrawn from under the lugs 15, and one or more of the lenses is free to be removed. Another lens may be put into place and the spring 36 and the cover frame replaced.

The cam 18 near the pivot of the lock member 17 is so formed and proportioned that it moves over the lock plate 31 almost as soon as that member begins to swing to lock position, and it presses that plate and thus the cover frame closely to the plate 13 of the inner frame. The lock movement of the member 17 continues until its lock projection 21 engages the seat 32. This engagement prevents release of the lock other than by intentional movement by pressure of fingers of the hand on the finger piece 20.

The cover frame is manipulated to and from lock position without bending of any of its parts. Although the edges 30 of the flanges 27 wedge tightly into the V-shaped recesses between the plate 13 and the fingers 16 thereof, outward momentary swing of the cover frame with the apexes of the recesses as the pivotal line, after the lock member 17 is released, does not result in any bending of the lugs 28, because their ends are curved from the plate. Moreover, no flexure of other parts of the cover frame and fixed frames is incident to removal and replacement of parts. Consequently, no openings past the edges of the lenses as a result of distortion can occur during long and normal use of the window.

I claim:

1. In association with a shield wall of sheet material having a sight opening, a window structure comprising an outer frame including a marginal plate on the outside of the shield wall around its sight opening and a flange protruding over that opening and encompassing a sight opening, an inner frame including a marginal plate of dimensions and shape corresponding to those of said outer frame on the inside of the shield wall opposite to said outer plate and a marginal wall on said inner plate protruding inwardly therefrom and encompassing a sight opening aligned with that of said outer frame, fasteners holding said plates against said shield wall, a lens in said outer frame closing the sight opening thereof, a spring urging said lens toward the flange of said outer frame, a removable cover frame comprising a wall fittable closely around the marginal wall of said inner frame, and a marginal flange encompassing a sight opening alignable with the sight openings of said inner and outer frames, and means to lock said cover frame on said inner frame.

2. In association with a shield wall of sheet material having a sight opening, a window structure comprising an outer frame including a marginal plate on the outside of the shield wall around its sight opening and a flange protruding over that opening and encompassing a sight opening, an inner frame including a marginal plate of dimensions and shape corresponding to those of said outer frame on the inside of the shield wall opposite said outer plate and a marginal wall on said inner plate protruding inwardly therefrom and encompassing a sight opening aligned with that of said outer frame, fasteners extending through said plates and holding them against the shield wall, a removable cover frame comprising a wall fittable closely around the marginal wall of said inner frame, and a marginal flange encompassing a sight opening alignable with the sight openings of said inner and outer frames, and means to lock said cover frame on said inner frame.

3. In association with a shield wall of sheet material having a sight opening, a window structure comprising an outer frame including a marginal plate on the outside of the shield wall around its sight opening and a flange protruding over that opening and encompassing a sight opening, an inner frame including a marginal plate of dimensions and shape corresponding to those of said outer frame on the inside of the shield wall opposite to said outer plate and a marginal wall on said inner plate protruding inwardly therefrom and encompassing a sight opening aligned with that of said outer frame, fasteners holding said plates against the shield wall, a lens in said outer frame closing the sight opening thereof, a spring frame in said inner frame urging said lens toward the flange of said outer frame, a removable cover frame on said inner frame including a marginal flange encompassing a sight opening aligned with those of said outer and inner frames and protruding over said spring frame, and means to retain said cover frame on said inner frame.

4. In a shield body of the character described having a sight opening, an outer fixed frame surrounding said opening, means on said frame to prevent outward displacement of a lens therein, an inner fixed frame opposite to said outer frame and comprising a plate against the inner side of said body, a finger on one side of the perimeter of said inner frame and disposed over said plate, a lock member pivoted on said plate at the opposite side of the frame perimeter, and a cover frame comprising a flange at one side thereof disposable under the finger of said inner frame, and a lock plate on the opposite side of said cover frame positioned to have said lock member swing to lock position thereover.

5. In a shield body of the character described having a sight opening, an outer fixed frame surrounding said opening, means on said frame to prevent outward displacement of a lens therein, an inner fixed frame opposite to said outer frame and comprising a plate against the inner side of said body, a finger at one side of the perimeter of said inner frame on and disposed over said plate and providing a V-shaped recess therewith, a lock member pivoted on said plate at the opposite side of the frame perimeter, and a cover frame comprising a flange at one side thereof insertable into said recess, and a lock plate at the opposite side of said cover frame positioned to have said lock member swing to lock position thereover.

FRANCIS D. HUNTSMAN.

REFERENCES CITED

The following references are of record in the file of this patent:

UNITED STATES PATENTS

| Number | Name | Date |
| --- | --- | --- |
| 1,885,426 | Flood | Nov. 1, 1932 |
| 2,152,865 | Bowers | Apr. 4, 1939 |